United States Patent [19]

Kanazawa et al.

[11] Patent Number: 4,896,737

[45] Date of Patent: Jan. 30, 1990

[54] FOUR-WHEEL STEERING APPARATUS FOR VEHICLE

[75] Inventors: Hirotaka Kanazawa, Hiroshima; Koushun Note, Higashhiroshima; Yasuhiro Nakashima; Takeshi Murai, both of Hiroshima, all of Japan

[73] Assignee: Mazda Motor Corporation, Hiroshima, Japan

[21] Appl. No.: 184,982

[22] Filed: Apr. 22, 1988

[30] Foreign Application Priority Data

Apr. 22, 1987 [JP] Japan .................................. 62-100866

[51] Int. Cl.$^4$ .............................................. B62D 5/06
[52] U.S. Cl. .................................................... 180/140
[58] Field of Search ............... 180/140, 141, 142, 143; 280/91

[56] References Cited

FOREIGN PATENT DOCUMENTS

0154991 9/1985 European Pat. Off. ............... 74/422
0077570 4/1988 Japan .

*Primary Examiner*—Charles A. Marmor
*Assistant Examiner*—Richard Camby
*Attorney, Agent, or Firm*—Fleit, Jacobson, Cohn, Price, Holman & Stern

[57] ABSTRACT

A four-wheel steering apparatus for a vehicle consisting of a steering mechanism that includes a steering wheel. A front wheel turning mechanism is operatively connected to the steering mechanism to turn the front wheels according to the turning angle of the steering wheel. A rear wheel turning mechanism is operatively connected to the steering mechanism to turn the rear wheels in response to operation of the steering wheel. A hydraulically operated power assist is connected with the rear wheels turning mechanism. A rear wheels steering ratio changing mechanism is provided for changing the ratio of the turning angle of the rear wheels with respect to the turning angle of the steering wheel. A return mechanism is provided for returning the rear wheels to a neutral position. A valve mechanism drains the oil applied from an oil pump to the power assist mechanism. An engine stop mechanism is provided for stopping the engine. A control mechanism is provided for controlling the valve mechanism to drain the oil when the engine stop mechanism outputs a signal for stopping the engine. A delay mechanism is provided for delaying the drain of the oil applied from the oil pump to the power assist means.

11 Claims, 6 Drawing Sheets

FOUR-WHEEL STEERING APPARATUS FOR VEHICLE

BACKGROUND OF THE INVENTION

1. Field of the Invention

The present invention relates to a four-wheel steering apparatus for vehicles and, more particularly, to a four-wheel steering apparatus for vehicles adapted to change a turning ratio of the rear wheels to the front wheels.

2. Description of the Prior Art

A four-wheel steering apparatus for a vehicle is known to turn the rear wheels in association with the front wheels in response to the operation of a steering wheel by a operator that includes a front wheel turning mechanism and an intercoupled rear wheel turning mechanism such that a steering angle of the steering wheel is arranged to be transmitted through both turning mechanisms to the front wheels and the rear wheels as a turning angle.

In such known four-wheel steering apparatus, a turning ratio of the rear wheels to the front wheels (that is, a ratio of a turning angle of the rear wheels to that of the front wheels) is not always constant, and may be commonly variable on the basis of a predetermined turning ratio characteristics. The turning ratio characteristics is set using a running state of the vehicle as a parameter. The parameters may include, for instance, vehicle speed, the steering angle of a steering wheel, and a transverse G (an acceleration in the transverse direction) acting on the vehicle.

The direction in which the rear wheels are turned may be determined by a so-called same phase direction and a so-called reverse phase direction.

In such four-wheel steering apparatus, when vehicle speed is low or a steering angle of the steering wheel is large, the rear wheels are turned in reverse phase direction so as to obtain an improved turning rate. Under a high vehicle speed or a small steering angle, the rear wheels are turned in same phase direction so as to obtain an improved maneuverability of the vehicle.

It has further been proposed in such four-wheel steering apparatus to provide a power-assisted steering mechanism for steering the rear wheels. For example, Japanese Utility Model Public Disclosure No. 57087/1986 discloses a vehicle four-wheel steering apparatus having a front power-assisted steering mechanism for steering front wheels, and a rear power-assisted steering mechanism for steering rear wheels. Hydraulic oil passages or conduits connect a hydraulic pump with the front and rear power-assisted steering mechanisms to supply oil to the power cylinders of the power-assisted steering mechanisms. The hydraulic pump is driven by the vehicle engine.

On the other hand it has further been proposed in such a four-wheel steering apparatus to provide a fail-safe system. Japanese Patent Public Disclosure No. 77570/1986 discloses a vehicle four-wheel steering apparatus having a return spring in the rear power-assisted steering mechanism. The return spring is provided for returning a power cylinder to its neutral position when oil pressure applied to the rear power-assisted steering mechanism is drained from an on-off valve. The on-off valve is actuated to the open position for drain of the oil pressure when the electric system fails.

In the four-wheel steering apparatus described above, the on-off valve is actuated to the closed position by electric force or power applied via the ignition switch, so that when the ignition switch is opened, the on-off valve moves to the open position. Just to turn off the ignition switch, will not stop the engine in a short time because of the force of inertia, so that the hydraulic pump driven by the engine will generate oil pressure during this short time.

If the on-off valve is positioned at the open position at the same time with the ignition switch turned off, oil pressure generated by the hydraulic pump will drain through the on-off valve abruptly. In this condition, the oil will flow at high velocity in the conduit and will lose velocity energy at a bending portion of the conduit generating a crashing sound.

SUMMARY OF THE INVENTION

It is therefore an object of the present invention to provide a four-wheel steering apparatus for preventing a crashing sound generated when the ignition switch is turned off.

In accordance with the present invention, a four-wheel steering apparatus is provided for a vehicle comprising a steering mechanism including a steering wheel, a front wheel turning mechanism operatively connected to the steering mechanism to turn the front wheels according to the turning angle of the steering wheel, a rear wheel turning mechanism operatively connected to the steering mechanism to turn the rear wheels in response to operation of the steering wheel, a power assist means connected with the rear wheels turning mechanism actuated by an oil pump driven by an engine, a rear wheel steering ratio changing mechanism for changing the ratio of the turning angle of said rear wheels with respect to the turning angle of said steering wheel, a return means for returning said rear wheels to a neutral position, and a valve means for draining the oil applied from the oil pump to the power assist means. The apparatus further includes an engine stop means for stopping the engine, a control means for controlling the valve means to drain the oil when the engine stop mean outputs a signal for stopping the engine, and a delay means for delaying the drain of the oil applied from the oil pump to the power assist means.

DETAILED DESCRIPTION OF THE PREFERRED EMBODIMENT

Embodiments of the present invention will be described more in detail with reference to drawings attached hereto.

Figure 1:
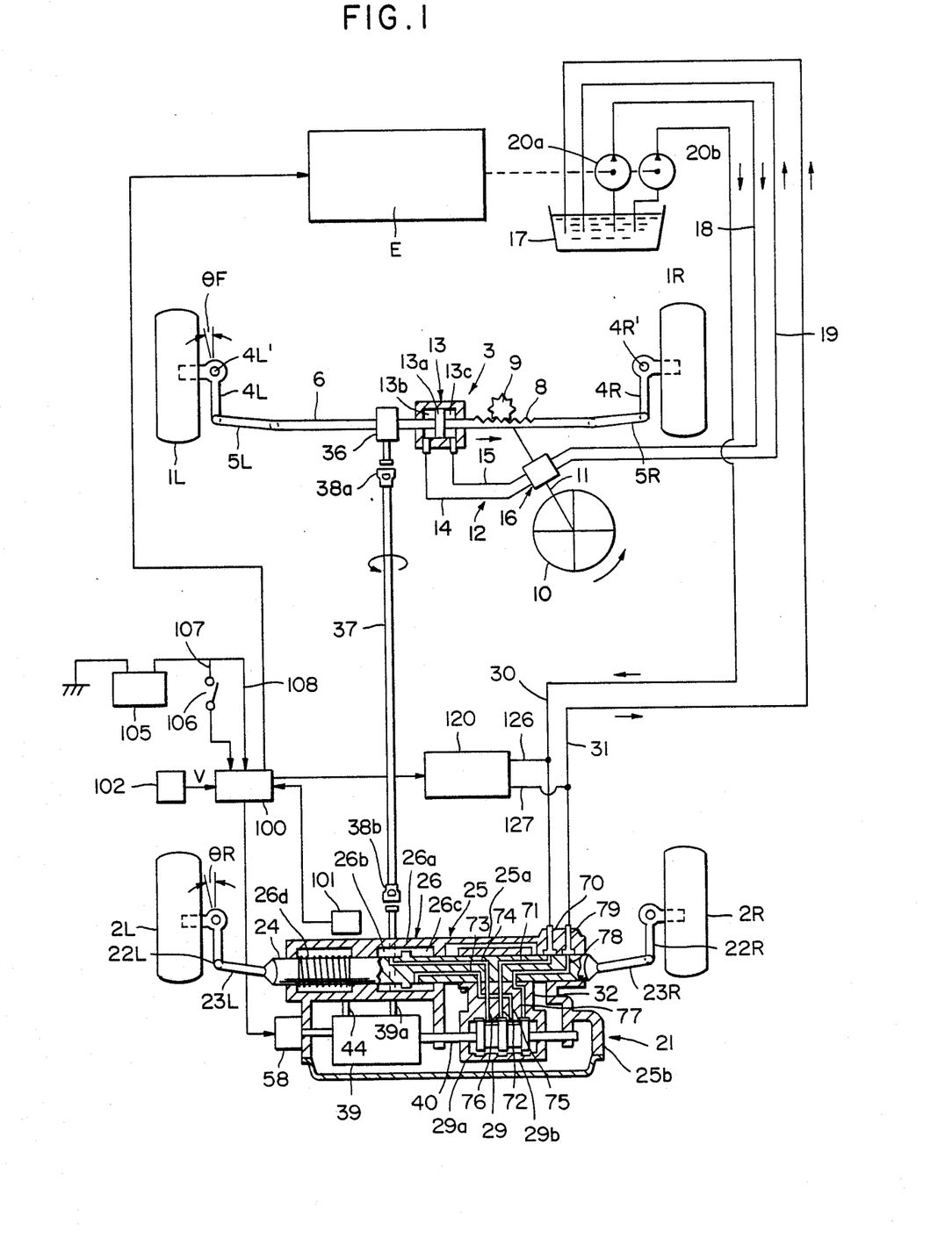
FIG. 1 is a plan view partly in schematic of a vehicle four-wheel steering system in accordance with the present invention.

In FIG. 1 reference numerals 1R and 1L, denote right and left front wheels; respectively, and reference numerals 2R and 2L denote right and left rear wheels, respectively. The right and left front wheels 1R, 1L are associated with a front wheel turning mechanism 3, and the right and left rear wheels 2R, 2L are associated with a rear wheel turning mechanism 21.

In the illustrated embodiment, the front wheel turning mechanism 3 is composed of right and left knuckle arms 4R and 4L, and a steering rack or rod 6 that interconnects the right and left tie rods 5R and 5L to each other. The front turning mechanism 3 is of a rack-and-pinion type in this particular embodiment. That is, the steering rod 6 is provided with a rack 8 that meshes with a pinion 9 connected at the end of a shaft 11. A steering wheel 10 is mounted on the other end of shaft 11 when the steering wheel 10 is turned right, on the one hand, the relay rod 6 is moved left in FIG. 1 to rotate clockwise the right and left knuckle arm 4R and 4L about their respective pivotal centers 4R and 4L, thereby turning the front wheels 1R, 1L in the clockwise direction by an amount corresponding to the turning angle of the steering wheel 10. When the steering wheel 10 is turned left, on the other hand, the front wheels 1R and 1L are turned in a similar manner in the counterclockwise direction in accordance with an amount corresponding to the turning angle of the steering wheel 10.

The rear wheel turning mechanism 21 is composed of right and left knuckle arms 22R and 22L, right and left tie rods 23R and 23L, and a steering rod 24 that interconnects the tie rods 23R and 23L to each other. In this embodiment, the rear wheel steering mechanism 21 includes a power assist mechanism 25 having a housing which is partly constituted by a cylindrical casing 25a. In the casing 25a, is disposed rear wheel steering rod 24 which extends through the casing 25a and has its opposite ends connected through tie rods 23R and 23L with knuckle arms 22R and 22L, respectively. It will be understood that, with the arrangement described above, right and left movements of the steering rod 24 will produce steering movement in the rear wheels 2R and 2L.

The casing 25a is formed with a power cylinder 26 encircling the steering rod 24 which is provided with a piston 26a dividing the interior space of the power cylinder 26 into hydraulic chambers 26b and 26c. The rear wheel steering mechanism 21 further includes a control unit 39 having an input shaft 39a and an output shaft which may be referred to as a control rod 40. The control rod 40 is located to extend in parallel with the steering rod 24.

There is a second rack-and-pinion mechanism 36 provided on the front wheel steering rod 6. The second rack-and-pinion mechanism 36 is connected through universal joints 38a and 38b and a connecting rod 37 with the input shaft 39a so that a longitudinal movement of the steering rod 6 is converted into a rotation of the connecting rod 37 and transmitted to the input shaft 39a of the control unit 39. The output shaft of a pulse motor 58 is connected to the control-unit 39 to adjust the steering ratio which is defined as a ratio of the steered angle or of the rear wheels 2R, 2L to the steered angle of the front wheels 1R, 1L the motor 58 is connected with a control circuit 100 which receives a vehicle speed signal from a speed detector 102 so that the rotation of the motor 58 is controlled in accordance with the vehicle speed to thereby control the steering ratio.

In FIG. 1, it will be noted that a casing 25a is further formed integrally with the casing 25b. In the casing 25b, there is provided a hydraulic control valve device 29 for controlling a supply of hydraulic pressure to and from the power cylinder 26. The control valve device 29 includes a valve casing 29a which is connected with the rear wheel steering rod 24 through an interconnecting section 32. In the valve casing 29a, there is a valve spool 29b which is connected at one end with the control rod 40 so that it is moved by the control rod 40 in the direction parallel with the steering rod 24. In order to control the hydraulic fluid supply to and from the hydraulic control valve device 29 and the power cylinder 26, the casing 25a and the steering rod 24 are formed with hydraulic oil passages.

As shown in FIG. 1, there is provided a hydraulic oil reservoir 17, a front hydraulic pump 20a and a rear hydraulic pump 20b driven by engine E of the vehicle to draw oil from the reservoir 17. The pump 20b has an outlet port which is connected through a pressure pipe 30 into a passage 70. The passage 70 is in communication with a passage 71 in the rear wheel steering rod 24, the passage 71 being in turn connected with a passage 72 which leads to the control valve device 29 at a valve chamber in the valve casing 29a. The hydraulic oil chambers 26b and 26c in the power cylinder 26 are connected respectively through passages 73 and 74 in the steering rod 24 and passages 75 and 76. A passage 77 is connected on one hand with the valve chamber and on the other hand with a passage 78 which is formed in the steering rod 24 and connected through a passage 79 and a return pipe 31 with the oil reservoir 17 for providing a return passage.

The front wheel turning mechanism 3, like the rear wheel turning mechanism 21, is provided with a power-assisted mechanism 12 that includes a cylinder 13 mounted on the steering rod 6 of the front wheel turning mechanism 3, cylinder 13 being fixed to the vehicle body. A piston 13a is integrated to the steering rod 6 so as to divide the cylinder 13 into a pair of compartments 13b and 13c. The compartments 13b and 13c in the cylinder 13 are connected through respective pipes 14 and 15 to a control valve 16 of the rotative type mounted on the shaft 11 of the front wheel turning mechanism 3. To the control valve 16 are connected a pipe 18 connected to the output side of the oil pump 20 also driven by engine E and return pipe 19 provided for return of the oil to the reservoir 17.

In the rear wheel turning mechanism 21, there is provided a return spring 26d so as to urge the steering rod 24 to a neutral position.

Figure 2:
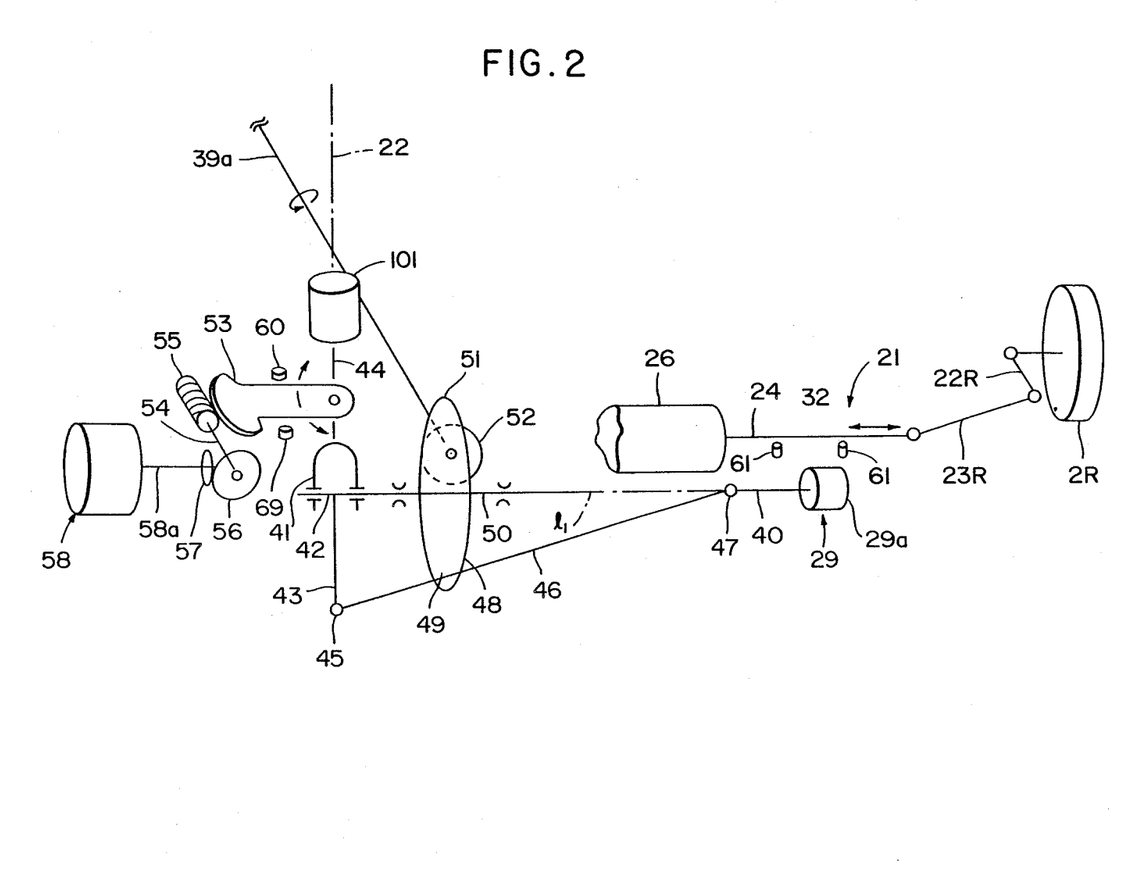
FIG. 2 is a schematic view illustrating a portion of a turning ratio changing mechanism.

An example of the control unit 39 will be described with reference to FIG. 2. In the control unit 39, the input member 40 of the control rod 32 is supported so as to move slidably in the transverse direction of the vehicle body along a line $l_1$, in FIG. 2, the control unit 39 includes a swinging arm 43 that is supported at its base portion for pivotal movement by a pin 42 with respect to a holder 41. The holder 41 is supported on the vehicle body so as to be rotatable about a line $l_2$, perpendicular to the line $l_1$ along which the input member 4D is moveable. The pin 42 is positioned at the intersection of the line $l_1$ and $l_2$ and extends in the direction perpendicular to the line $l_2$. Accordingly, although the swinging arm 43 is able to swing about the pin 42, the rotation of the holder 41 varies an angle of inclination of the pin 42 with respect to a plane (reference plane) perpendicular to the line $l_1$. The front end portion of the swinging arm 43 is connected with the input member 40 by way of a connecting rod 46. Specifically, the connecting rod 46 is connected through a ball joint 45 to the front end portion of the swinging arm 43, on the one hand, and through a ball joint 47 to the input member 40, on the other hand.

The distance between the ball joints 45 and 47 positioned at each of the end portions of the swinging arm 43 is kept constant by the connecting rod 46. Therefore, when the ball joint 45 is moved in the left and right direction in FIG. 2, the input member 40 is also moved in the left-and-right direction in FIG. 2 in accordance with the movement of the ball 45(47).

Swinging movement of the swinging arm 43 about the pin 42 is made according to the movement of operation of the steering mechanism 3, i.e., to the turning angle of the steering wheel 10. For this purpose, in this embodiment, the connecting rod 46 is connected with a rotary plate 48 composed of a bevel gear. The rotary plate 48 is supported rotatively on the vehicle body so as to allow the rotary axis 50 thereof to coincide with the line $l_1$. The connecting rod 46 penetrates slidably an eccentric portion of the rotary plate 48 by way of a ball joint 49, and the rotary plate 48 composed of the bevel gear is in mesh with a bevel gear 52 that in turn is connected to the input rod 39a.

The swinging arm 43 is swung by the rotary plate 48 about the pin 42 by an amount corresponding to the turning angle of the steering wheel. When the axis of the pin 42 inclines against the line $l_1$, the ball joint 45 moves in the right-and-left direction in FIG. 2, i.e., toward the line $l_1$, in response to the pivotal movement about the pin 42 and this movement is transmitted through the connecting rod 46 to the input member 40, thereby leading to the movement of the input member 40. The movement of the ball joint 45 in the right-and-left direction in FIG. 2 is changed to change a turning ratio when an angle of inclination of the pin 42, that is, an angle of rotation of the holder 41, is changed, even if an angle of a swinging movement of the swinging arm 43 about the pin 42 is identical.

In order to change the angle of inclination, a sector gear 53 is fixedly mounted as a worm wheel on the rotary shaft 44 of the holder 41 and is in mesh with a worm gear 55 that is rotatively driven by a stepping motor 58 a inclination angle changing means by way of a pair of bevel gears 56 and 57. The sector gear 53 driven by the step motor 58 is arranged so as to cause both ends of swinging stokes to be controlled by a stopper 60 at the same phase part and a stopper 59 at the reverse phase part, respectively. A rod stopper 61 is provided for limiting the maximum movable range of the steering rod 24.

The following description concerns the swinging angle of the swinging arm 43 about the pin 42 and the angle of inclination of the swinging arm 43 (the angle of inclination of the pin 42) on the movement of the ball joint 45 in the direction of the line $l_1$. In the following description, the swinging angle of the swinging arm 43 about the pin 42 is represented by $\theta$, the reference plane perpendicular to the line $l_1$ is represented by $\delta$, the angle of inclination of the swinging plane of the swinging arm 46 with respect to the reference plane $\delta$ is represented by $\alpha$, and the eccentric distance of the ball joint 45 from the pin 42 is represented by $\gamma$. In this case, the amount of movement X of the ball joint 45 in the direction of the line $l_1$ is represented by the formula: $X = r \tan \alpha \cdot \sin \theta$ and is a function of $\alpha$ and $\theta$. Accordingly, when the angle $\alpha$ of inclination is fixed at a particular value, on the one hand, the amount of movement X depends solely upon the function of $\theta$ or the turning angle of the steering wheel. When the angle $\alpha$ of inclination is changed, on the other hand, the amount of movement X is changed even if the turning angle of the steering wheel is identical. In other words, the change of the angle $\alpha$ of inclination leads to the change of turning ratios. Therefore, an angle of revolution of the step motor 58 (step numbers) corresponds primarily will the turning ratio.

The mechanism of changing turning ratios itself is disclosed in U.S. Pat. No. 4,572,316. A description thereof will accordingly be omitted here.

Figure 3:
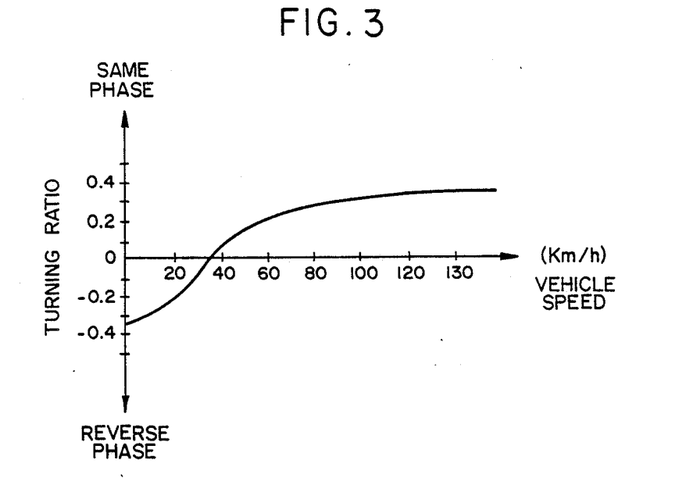
FIG. 3 and FIG. 4 are graphs illustrating variations in turning ratio characteristics.

The turning ratios may be changed on the basis of turning ratio characteristics predetermined using vehicle speed as a parameter, for instance, as shown in FIG. 3.

Figure 4:
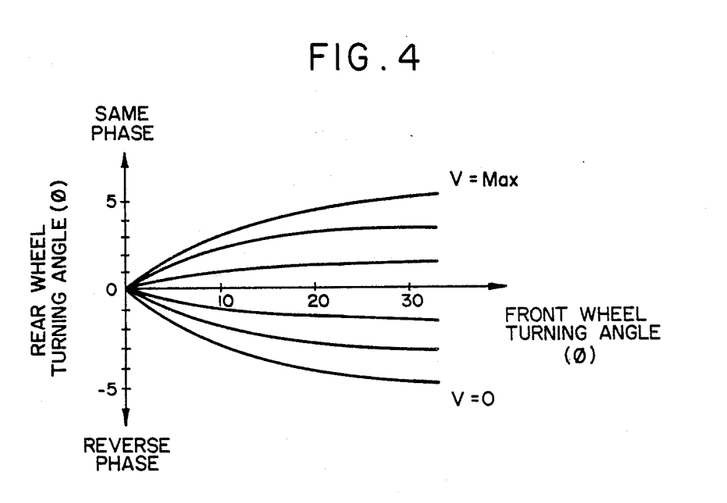

FIG. 4 shows the relationship of a rear wheel turning with a front wheel turning angle as a replacement of the turning ratio characteristics indicated in FIG. 3.

Referring to FIG. 3, under a low vehicle speed, the rear wheels are steered in the reverse phase direction so as to obtain an improved turning rate. At the vehicle speed of 35 km/h, the steering rate becomes zero so that the rear wheels are not steered. Under a high vehicle speed, the rear wheels are steered in the same phase direction so that the road grip of the wheels under cornering will be improved. The control unit 39 is adjusted so that the steering ratio is controlled in accordance with the vehicle speed in the manner as shown in FIG. 3. In order to protect the steering ratio detector 101 from foreign articles, it is located above the rear wheel steering rod 24.

Figure 5:
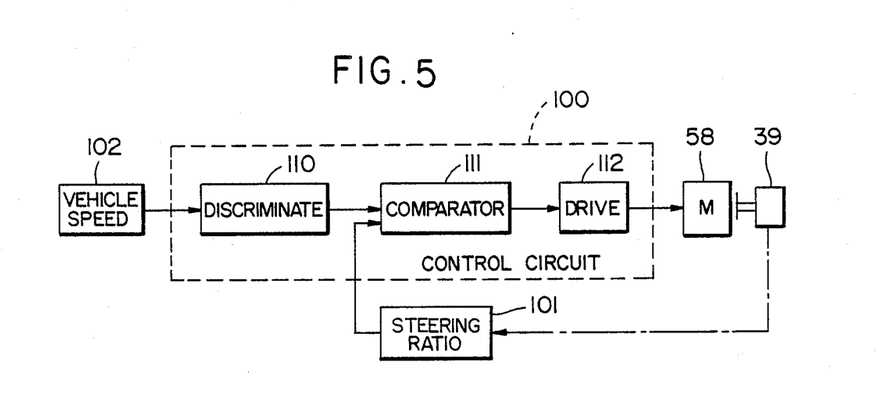
FIG. 5 is a block diagram showing a control for changing the steering angle ratio.

Referring to FIG. 5, there is shown an example of the control circuit 100 for controlling the step motor 58 to thereby control the steering ratio. The circuit 100 includes a discriminating circuit 110 which receives a vehicle speed signal from the speed detector 102. The discriminating circuit 110 has an output connected with a comparator 111 of which output is connected with a drive circuit 112. The comparator 111 further receives a steering ratio signal from the detector 101 and compares the signal from the discriminating circuit 110 with the steering ratio signal. The driving circuit 112 receives the output of the comparator 111 and produces a motor driving signal.

Figure 6A:
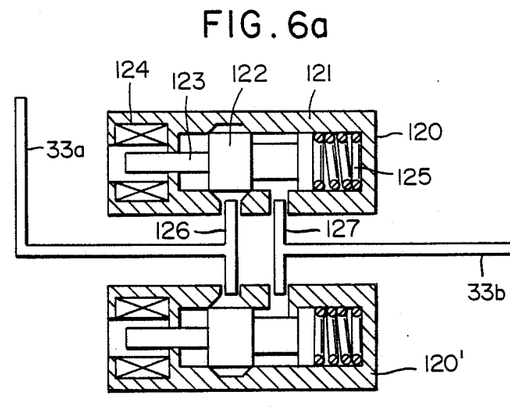
FIG. 6a and FIG. 6b are details of the spool valve shown of FIG. 1.
Figure 6B:
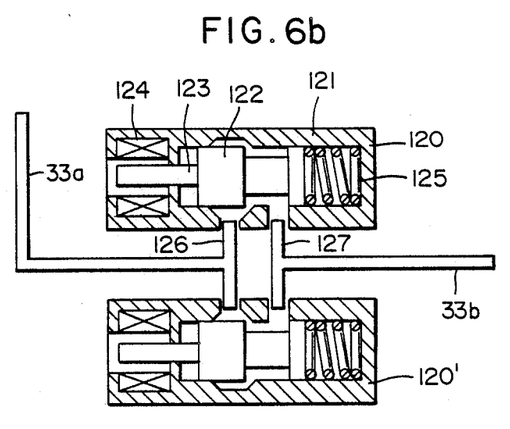

Turning now back to FIG. 1, the pressure pipe 30 and the return pipe 31 for the rear wheels steering mechanism 21 are connected to each other through passages 126 and 127 that in turn are connected with an electomagnetic on-off valve 120 shown in detail in FIGS. 6a and b.

The on-off valve 120 has a cylindrical valve casing 121 with a spool valve 122 slidably mounted in the valve casing 121. A plunger 123 is connected coaxially to the spool valve 122 at one end. A return spring 125 biases the other end of the spool valve 122. The plunger 123 is received within an electomagnetic coil 124. The valve casing 121 has a passage 126 and a passage 127. The passage 126 is connected to the pressure pipe 30 and the passage 127 is connected to the return pipe 31.

In this embodiment, the on-off valve 120 is connected to an identical on-off valve 120 ' in parallel for reliability.

The on-off valve 120 is actuated by a control signal from the control unit 100. When the coil 124 is excited by the control signal from the control unit 100, as shown in FIG. 6a, the spool valve 122 moves to the right as viewed in FIG. 6a loading or compressing spring 125 and cuts-off any connection of passage 126 and passage 127. In this case, the spool valve 122 movement overcomes the return force of the return spring 125. When the coil 124 is not excited, as shown in FIG. 6b, the spool valve 122 moves to the left by the return force of the return spring 125 for connecting the passage 126 and the passage 127.

A first electric line 107 and a second electric line 108 are connected to the control unit 100. The first electric line 107 is connected to a battery 105 through an ignition switch 106. The second electric line 108 is connected to the battery 105 directly.

Figure 7:
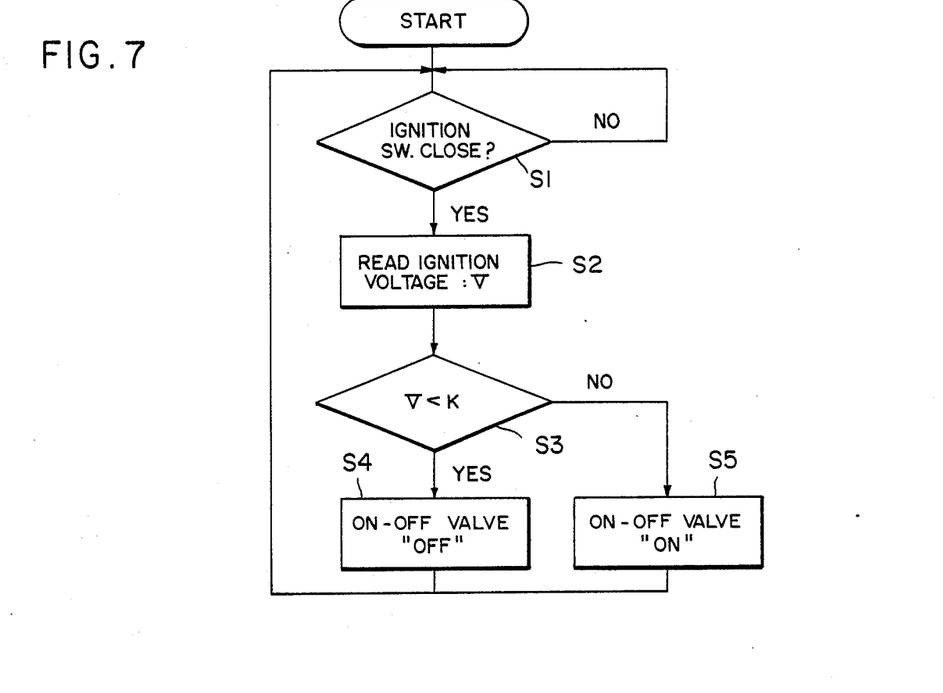
FIG. 7 and FIG. 8 are flow charts illustrating examples of a control unit according to the present invention.
Figure 8:
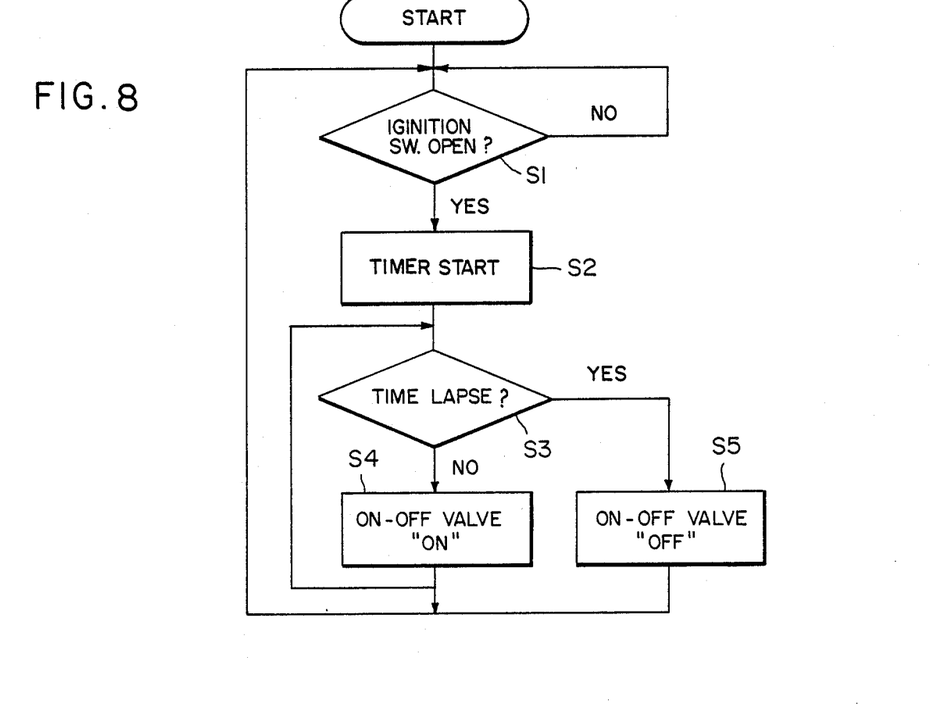

The on-off valve 120 is controlled by the control unit 100 as shown in FIG. 7 and FIG. 8. FIG. 7 shows a flow chart for failed condition of electric system. The control unit 100 detects whether the ignition switch 106 is opened or closed in S1. If the ignition switch 106 is detected as "closed", a voltage V of the first electric line 107 ignition voltage, is detected in S2. In S3, if the voltage V is lower than the predetermined value K (for example K=9 VOLTS), the control unit 100 outputs an "OFF" signal to the on-off valve 120 in S4, (i.e., the on-off valve not excited). On the other hand, if the voltage V is equal to or higher than the predetermined value K, the control unit 100 outputs an "ON" signal to the on-off valve 120 in S5 (i.e., the on-off valve excited). As described above, if the voltage of the first electric line is lower than the predetermined value, the on-off valve 120 is in the not excited condition as shown in FIG. 6b. In this condition, the pressure pipe 30 and the return pipe 31 are connected directly so that the rear power-assisted steering mechanism 25 does not have applied to it an oil pressure and the rear wheels 2L, 2R are returned to the neutral position by the return spring 26d.

FIG. 8 shows a flow chart for controlling the on-off valve 120 if ignition switch 106 is opened. The control unit 100 detects whether the ignition switch 106 is opened or closed in S1. If the ignition switch is detected as "opened", a timer circuit provided in the control unit 100 starts in S2. If a predetermined time, e.g. about 7 to 10 seconds doesn't lapse in S3, the control unit 100 outputs an "ON" signal to the on-off valve 120 in S4. If the predetermined time lapsed in S4, the control unit 100 outputs an "OFF" signal to the on-off valve 120 in S5.

In operation, the control unit 100 reads the desired steering angle of the rear wheels 2L, 2R based on the vehicle speed signal from the speed sensor 102 to determine the desired rear wheels turning angle. The control unit 100 then produces a signal for operating the step motor 58 so that the rear wheels 2L, 2R are steered in accordance with the steering characteristics as shown in FIG. 3 or FIG. 4.

The front wheels 1L, 1R are steered by the power cylinder 13 of the front power-assisted steering mechanism 12 which is operated by oil pressure from the oil pump 20a. The rear wheels 2L, 2R are steered by the power cylinder 26 of the rear power-assisted steering mechanism 25 which is operated by oil pressure from the oil pump 20b.

If the electric system fails, the control unit 100 outputs the "OFF" signal to the on-off valve 120 for connecting the pressure pipe 30 and the return pipe 31 directly. When the on-off valve 120 is "OFF" the rear wheels 2L, 2R are forced to their neutral position by the action of the return spring 26d, so that in spite of the failure, safety driving can be done.

For turning off the engine, the driver turns the ignition switch 106 to the open position. This opens the ignition switch 106, but the engine will keep rotating a short time because of the inertia force. Therefore, the oil pumps 20a, 20b driven by the engine will generate oil pressure for a short time.

While the oil pump 20b keeps pumping the on-off valve 120 is excited by the timer circuit of the control unit 100, so that the on-off valve 120 becomes not excited only after the oil pressure of the pressure pipe 30 is brought to a low pressure condition.

Figure 9A:
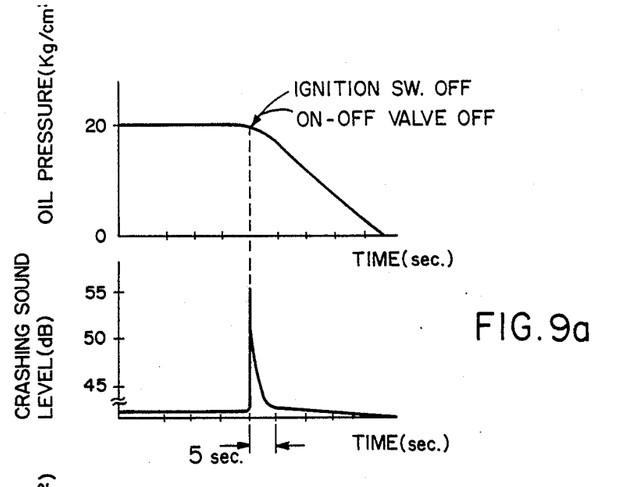
FIG. 9a, 9b and 9c are graphs illustrating crashing sound levels.

FIG. 9a shows the change of oil pressure in the pressure pipe 30 and level of crashing sound relative to time, when the on-off valve 120 is positioned to the open position at the same time the ignition switch is turned off. As noted, there is a loud crash, about 55 db for about 3-5 seconds.

Figure 9B:
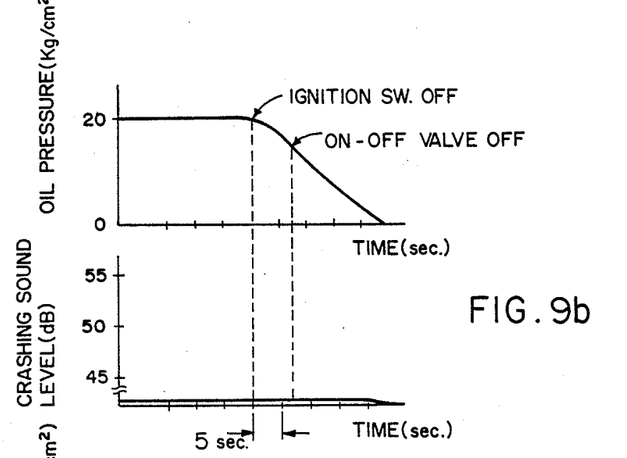

FIG. 9b shows the change of oil pressure in the pressure pipe 30 and level of crashing sound relative to time when the on-off valve 120 is positioned to the open position after the predetermined time lapsed. Under these conditions, the crashing sound does not occur.

Figure 10:
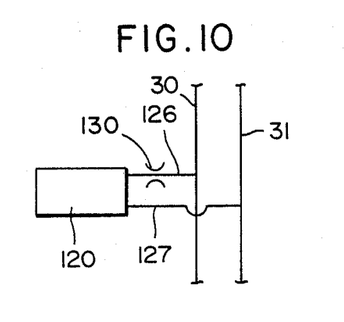
FIG. 10 shows a second embodiment of the present invention.

FIG. 10 shows a second embodiment. An orifice 130 is provided in passage 126 connecting pressure pipe 30 with valve 120. No timer circuit is used.

Figure 11:
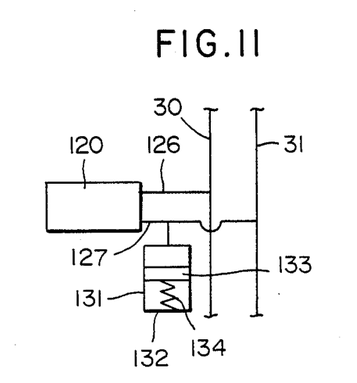
FIG. 11 shows a third embodiment of the present invention.

FIG. 11 shows a third embodiment. A damper 131 is provided in passage 127 connecting valve 120 with return pipe 31. No timer circuit is used. The damper 131 has a cylindrical casing 132. A piston 133 is provided in the casing 132 movable up and down a shown in FIG. 11. A spring 124 is provided between the piston 133 and the casing 132 to bias the piston 133 to the up direction as shown in FIG. 11.

Figure 9C:
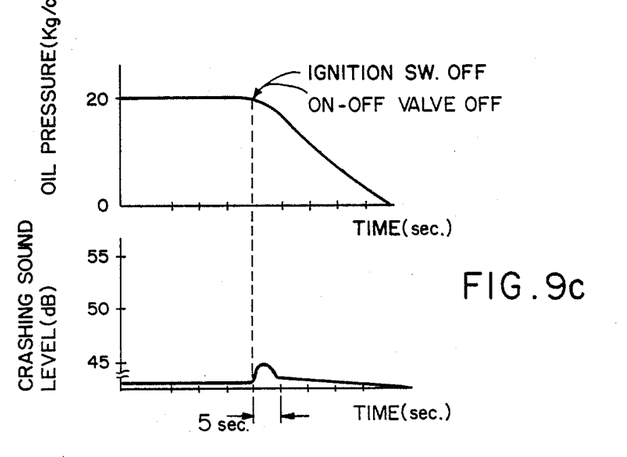

FIG. 9c shows the change of oil pressure in the pressure pipe 30 and level of crashing sound relative to time in the case of using the orifice or damper as shown in FIG. 10 or FIG. 11. In the second and third embodiment, as shown in FIG. 9c the crashing sound is decreased effectively to about a peak of 45 dB for about 5 seconds.

We claim:

1. In a four-wheel steering apparatus for a vehicle including rear wheel power steering means for turning rear wheels, a hydraulic system for supplying oil under pressure to the rear wheel power steering means, and valve means for draining oil from the rear wheel power steering means, the improvement comprising: engine stop means for outputting a signal to stop the vehicle engine, and control means for actuating said valve means for draining oil at a predetermined time after said engine stop means outputs a signal for stopping the vehicle engine, said valve means including an electromagnetic coil for keeping said valve means in a closed position when said coil is excited.

2. In a vehicle four-wheel steering apparatus in accordance with claim 1 wherein said engine stop means comprises an ignition switch.

3. In a vehicle four-wheel steering apparatus in accordance with claim 1 wherein said valve means is kept in opened position responsive to an electric failure.

4. In a vehicle four-wheel steering apparatus in accordance with claim 1 wherein said valve means is provided between a pressure pipe and a return pipe of said hydraulic system.

5. In a vehicle four-wheel steering apparatus in accordance with claim 4 wherein said valve means comprises two spool valves provided in parallel.

6. In a vehicle four-wheel steering apparatus in accordance with claim 1 wherein said control means includes delay means for preventing said valve means from opening for a predetermined period after said engine stop means is operated.

7. In a vehicle four-wheel steering apparatus in accordance with claim 6 wherein said valve means is provided between a pressure pipe and a return pipe of said hydraulic system and said delay means is provided between said valve means and said pressure pipe for limiting the flowing of the oil therebetween.

8. In a vehicle four-wheel steering apparatus in accordance with claim 1 wherein said valve means is provided between a pressure pipe and a return pipe of said hydraulic system and said control means includes delay means provided between said valve means and said return pipe for limiting the flowing of oil.

9. In a four-wheel steering apparatus for a vehicle including rear wheel power steering means for turning rear wheels, a hydraulic system for supplying oil under pressure to the rear wheel power steering means, and valve means for draining oil from the rear wheel power steering means, the improvement comprising: engine stop means for outputting a signal to stop the vehicle engine, control means for actuating said valve means for draining oil at a predetermined time after said engine stop means outputs a signal for stopping the vehicle engine when a signal is received from said engine stop means, said control means including delay means for keeping said valve means in a closed position when a signal is received from said control means, said delay means delaying actuation of said valve means during said predetermined time.

10. In a four-wheel steering apparatus for a vehicle including rear wheel power steering means for turning rear wheels, a hydraulic system for supplying oil under pressure to the rear wheel power steering means, and valve means for draining oil from the rear wheel power steering means, the improvement comprising: engine stop means for outputting a signal to stop the vehicle engine, control means for actuating said valve means for draining oil at a predetermined time after said engine stop means outputs a signal for stopping the vehicle engine, said control means including time delay means for setting a sufficient time delay during which an oil pump of said hydraulic system substantially stops, said time delay means delaying actuation of said valve during said time delay after said engine stop means outputs a signal for stopping the vehicle.

11. In a four-wheel steering apparatus for a vehicle in accordance with claim 10, wherein said oil pump is driven by the vehicle engine.

* * * * *